US012573702B2

(12) United States Patent 
Gao et al.

(10) Patent No.: US 12,573,702 B2 
(45) Date of Patent: Mar. 10, 2026

(54) BRACKET ASSEMBLY FOR BATTERY PACK AND BATTERY PACK INCLUDING THE SAME

(71) Applicant: FORD GLOBAL TECHNOLOGIES, LLC, Dearborn, MI (US)

(72) Inventors: Fei Gao, Hefei (CN); Larry Wang, Nanjing (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 856 days.

(21) Appl. No.: 17/844,136

(22) Filed: Jun. 20, 2022

(65) Prior Publication Data

US 2022/0416352 A1 Dec. 29, 2022

(30) Foreign Application Priority Data

Jun. 24, 2021 (CN) .......................... 202110707888.2

(51) Int. Cl.
H01M 50/262 (2021.01)
H01M 10/653 (2014.01)
H01M 50/249 (2021.01)

(52) U.S. Cl.
CPC ....... H01M 50/262 (2021.01); H01M 10/653 (2015.04); H01M 50/249 (2021.01); *H01M 2220/20* (2013.01)

(58) Field of Classification Search
CPC ............. H01M 10/653; H01M 50/249; H01M 50/262; B60K 2001/0438
See application file for complete search history.

(56) References Cited

U.S. PATENT DOCUMENTS

| | | | |
|---|---|---|---|
| 8,616,311 B2 | 12/2013 | Tsurumi et al. | |
| 10,017,037 B2 * | 7/2018 | Newman ............. | H01M 50/271 |
| 11,038,236 B2 * | 6/2021 | Montgomery ...... | H01M 50/244 |
| 11,114,715 B2 * | 9/2021 | Harris ................. | H01M 50/227 |
| 12,288,893 B2 * | 4/2025 | Tomlinson .......... | H01M 50/209 |
| 12,427,872 B2 * | 9/2025 | Gray ................... | H01M 50/244 |
| 2017/0096066 A1 | 4/2017 | Lee et al. | |
| 2022/0416352 A1 * | 12/2022 | Gao .................... | H01M 50/233 |
| 2024/0113376 A1 * | 4/2024 | Tomlinson .......... | H01M 50/262 |
| 2024/0136620 A1 * | 4/2024 | Kim .................... | H01M 50/249 |

FOREIGN PATENT DOCUMENTS

| | | |
|---|---|---|
| CN | 106043499 A | 10/2016 |
| CN | 208585206 U | 3/2019 |
| CN | 111757631 A | 10/2020 |

* cited by examiner

*Primary Examiner* — Jeffrey J Restifo
(74) *Attorney, Agent, or Firm* — David B. Kelley; Carlson, Gaskey & Olds, P.C.

(57) ABSTRACT

A method for forming a ground connection for a battery pack module bracket may include providing a fastener and a battery pack case covered with a clad layer; connecting a module bracket to the battery pack case by the fastener and a mating nut, the nut including an open groove extending axially and open toward a central axis, rotating the nut onto the fastener and scraping off the material of the clad layer of the fastener by the edge of the open groove so that the module bracket is electrically connected with the fastener and the battery pack case through the nut.

10 Claims, 7 Drawing Sheets

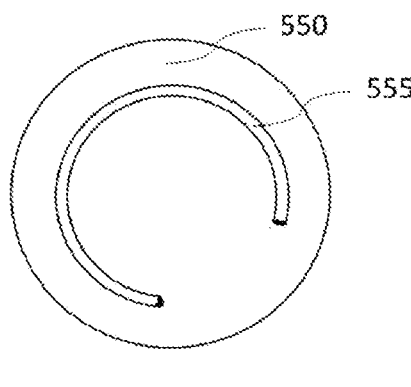
FIG. 7
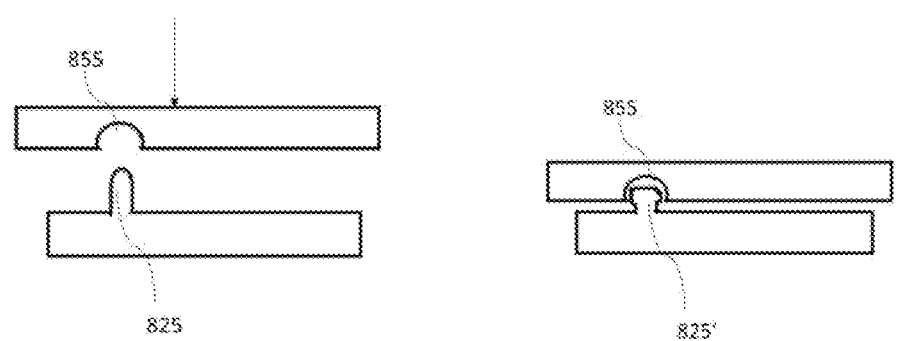
FIG. 8A                  FIG. 8B
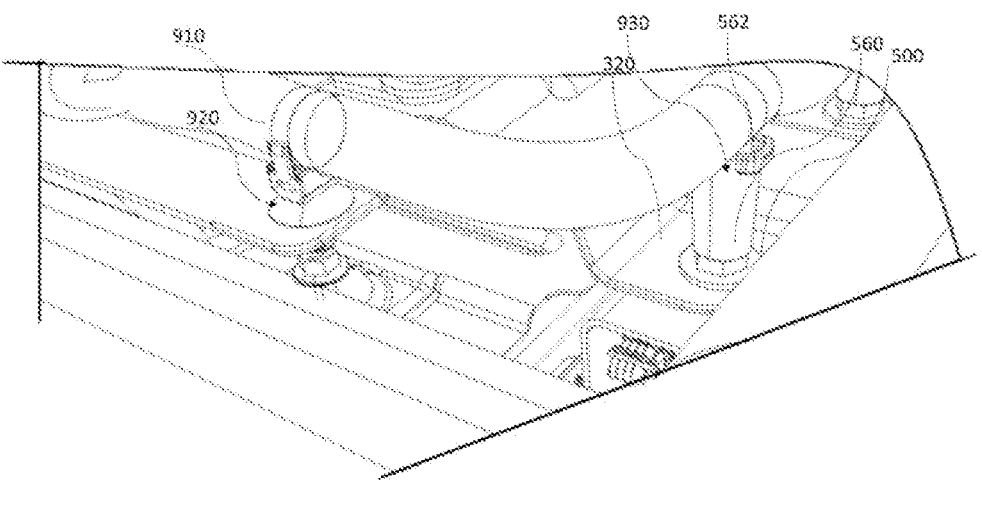
FIG. 9

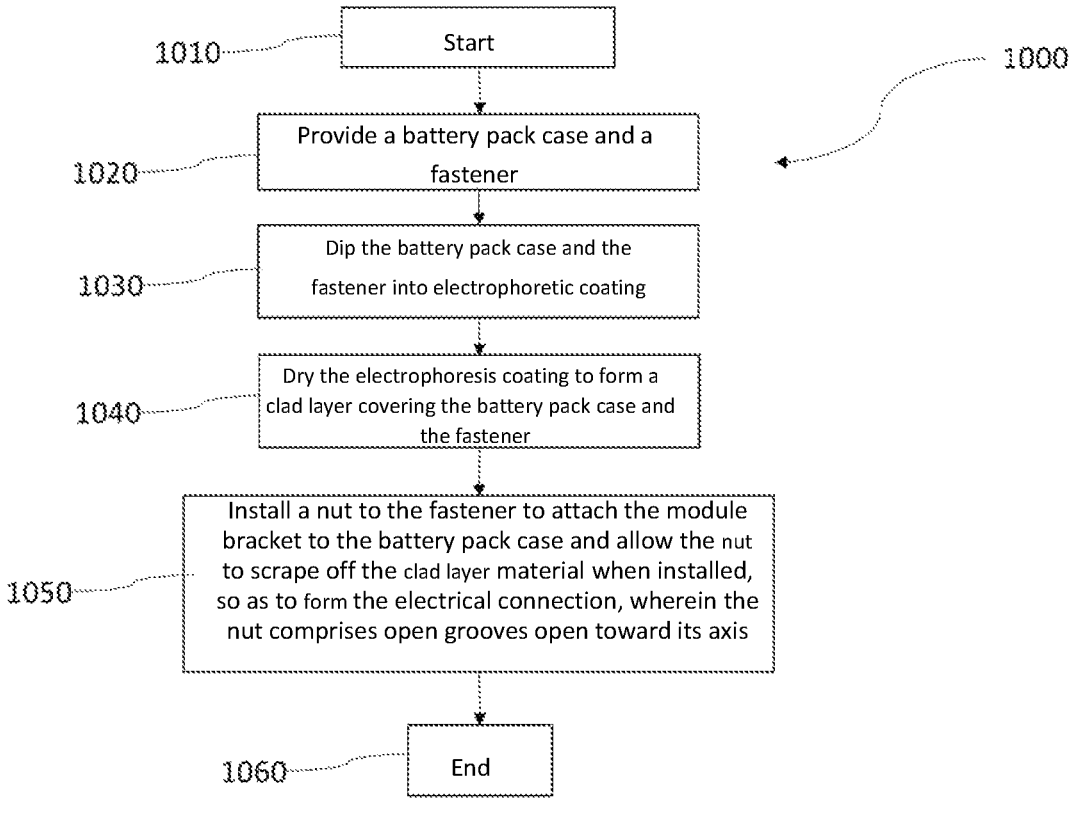

1010 ---- Start

1000

1020 ---- Provide a battery pack case and a
fastener

1030 ---- Dip the battery pack case and the
fastener into electrophoretic coating 1040 ---- Dry the electrophoresis coating to form a
clad layer covering the battery pack case and
the fastener 1050 ---- Install a nut to the fastener to attach the module
bracket to the battery pack case and allow the nut
to scrape off the clad layer material when installed,
so as to form the electrical connection, wherein the
nut comprises open grooves open toward its axis 1060 ---- End

FIG. 10

BRACKET ASSEMBLY FOR BATTERY PACK AND BATTERY PACK INCLUDING THE SAME

CROSS-REFERENCE TO RELATED APPLICATIONS

This disclosure claims priority to Chinese Patent Application No. 2021107078882, which was filed on Jun. 24, 2021 and is incorporated herein by reference in its entirety.

TECHNICAL FIELD

The present disclosure relates to a bracket assembly, and in particular to a bracket assembly for installing a battery control unit in a battery pack.

BACKGROUND

Electrified vehicles have developed rapidly due to their advantages in reducing fuel consumption and exhaust emissions. A typical electrified vehicle includes battery packs that can provide driving power, and the battery pack is usually grounded by connecting to the chassis. It is a research focus on how to achieve a stable installation between the battery pack and the vehicle.

CN 208585206U provides a bracket for an electric vehicle controller. It comprises a bracket body. The bracket body comprises a through hole and an installation groove of an L-shaped subsection. It provides stable support, so that the controller is subjected to reduced vibration from the vehicle body.

There is further room for enhancing the bracket installation.

SUMMARY

In view of the problems existing in the related art, the purpose of the present disclosure is to provide a bracket that can stably support a battery pack electronic control module and a vehicle including the same, and also to provide a method for forming a ground connection for a battery pack module bracket.

According to one aspect of the present disclosure, the present disclosure provides a method for forming a ground connection for a battery pack module bracket, the method including: providing a fastener and a battery pack case covered with a clad layer; connecting a module bracket to the battery pack case by the fastener and a mating nut, the nut including an open groove extending axially and open toward its central axis, and rotating the nut onto the fastener and scraping off the material of the clad layer of the fastener by an edge of the open groove so that the module bracket is electrically connected with the fastener and the battery pack case through the nut.

In one embodiment, the nut is configured to form a tight fit connection with the fastener, the nut is configured to form an interference fit with the fastener covered with the clad layer, and the nut at least partially forms the tight fit connection with the fastener after scraping the material of the clad layer by the edge.

In another embodiment, the fastener covered with the clad layer has an outer diameter that is greater than an inner diameter of the nut at the edge.

In yet another embodiment, the open groove is a through groove in an axial direction of the nut so as to allow at least partially the scraped material of the clad layer to drain through the groove.

In yet another embodiment, the method includes forming an annular recess in the nut and providing an annular sleeve of a second material in the annular recess.

In yet another embodiment, the method further includes dipping the battery pack case and the fastener into electrophoretic coating, and drying the electrophoretic coating to form a clad layer covering the battery pack case and the fastener.

In yet another embodiment, the method further includes providing a battery pack case with at least one fastener mounted thereon, and the fastener is welded and/or riveted to the battery pack case or an auxiliary bracket located within the battery pack case.

In yet another embodiment, the method includes removing residual material of the clad layer within the through groove by vacuum suction.

In yet another embodiment, the method further includes: providing a washer between the module bracket and the nut, and a first surface of the washer is configured to contact with the bracket, a second surface of the washer is configured to contact with the nut, the second surface of the washer includes a first arc-shaped feature, the nut includes a second corresponding arc-shaped feature, the first arc-shaped feature and the second arc-shaped feature cooperate with each other to allow relative rotation between the nut and the washer, the first arc-shaped feature is one of a protrusion and a notch, the second arc-shaped feature is the other, and when torque is applied to the nut, the nut rotates relative to the washer, while the washer does not rotate.

In yet another embodiment, the method includes preforming the washer and the nut into one piece through a press riveting process.

According to another aspect of the present disclosure, the present disclosure provides an electronic control module bracket assembly for a battery pack, including: a module bracket connected to a battery pack case through a fastener assembly, the fastener assembly including a fastener covered with a clad layer and a nut, the nut including a plurality of open grooves axially extending and open toward its axis, at least a portion of the open groove at an edge has a first inner diameter, the fastener covered with the clad layer has a first outer diameter, the first inner diameter is smaller than the first outer diameter, and the nut is configured to scrape the material of the clad layer of the fastener by the edge of the nut while being installed to the fastener, so as to electrically connect the module bracket to the fastener.

In one embodiment, the nut is configured to form a tight fit connection with the fastener, the nut is configured to form an interference fit with the fastener covered with a clad layer, and the nut at least partially forms the tight fit connection with the fastener after scraping the clad layer by the edge of the nut.

In another embodiment, the nut further includes an annular sleeve disposed in an annular recess at an inner peripheral wall of the nut, and the annular recess has a dimension in a radial direction smaller than that of the open groove.

In yet another embodiment, the nut is configured to form a tight fit connection with the fastener, and the nut is configured to form an interference fit with the fastener that includes the clad layer, and the nut at least partially forms the tight fit connection with the fastener after scraping the clad layer by the edge of the nut.

In yet another embodiment, the bracket includes a bracket body and at least two bracket legs bending and extending from the body, each bracket leg is electrically connected to the battery pack case through the fastener assembly, the two bracket legs both extend away from the bracket body, and two bracket legs gradually extend away from each other in a direction perpendicular to the bracket body, thereby forming a substantially trapezoidal cross-section, and the bracket is configured to carry electric control unit thereon and accommodate high-voltage electronic components under it.

In yet another embodiment, the fastener assembly further includes a washer, a first surface of the washer is configured to contact with the bracket, a second surface of the washer is configured to contact with the nut, the second surface of the washer includes a first arc-shaped feature, the nut comprises a second corresponding arc-shaped feature, the first arc-shaped feature and the second arc-shaped feature cooperate with each other to establish a connection and allow relative rotation between the nut and the washer, and the first arc-shaped feature is one of a protrusion and a notch, and the second arc-shaped feature is the other.

In yet another embodiment, the second surface of the washer has a protrusion with a mushroom head cross-section, the nut has a notch matched with the protrusion, and in the plane where the washer is located, the protrusion and the notch are of concentric configuration and have a length greater than a length of a semicircle.

In yet another embodiment, the fastener includes a stud and a head, a circular step is disposed at an end of the stud close to the head, the circular step has a gradually increasing diameter in a first direction extending from the head to the stud, and a plurality of serrated lug bosses are formed on the surface of the head facing the stud.

In yet another embodiment, the bracket assembly further includes a wire harness retainer disposed on the fastener assembly, the wire harness retainer includes a sleeve-shaped locking portion mounted on the fastener assembly and a wire harness clip extending from the locking portion.

In yet another embodiment, the bracket includes a support lug boss located at an edge of the bracket and a first lug boss spaced from the support lug boss, the first lug boss is provided with a thermally conductive material attached thereon, the support lug boss and the first lug boss directly contact with the electric control module, and a first gap is formed between the electric control module and non-supporting areas outside the support lug boss and the first lug boss.

The above and other advantages and features of the present disclosure will become apparent from the following detailed description by reading alone or in conjunction with the drawings.

BRIEF DESCRIPTION OF THE DRAWINGS

For a better understanding of the present disclosure, reference may be made to the embodiments shown in the following figures. Components in the figures are not necessarily to scale and some elements may be omitted. Alternatively, in some instances the proportions may have been exaggerated in order to emphasize and clearly illustrate the novel features described herein. Additionally, the system components may be arranged differently, as is known in the art. Furthermore, in the drawings, like reference numerals refer to corresponding parts throughout the several drawings, wherein:

FIG. 7 shows an arc-shaped feature configuration according to an embodiment of the present disclosure;

FIG. 8A and FIG. 8B show schematic diagrams of a riveting process according to an embodiment of the present disclosure;

FIG. 9 shows a wire harness retainer according to an embodiment of the present disclosure; and FIG. 10 shows a method that may be used to form a ground connection according to one embodiment of the present disclosure.

DETAILED DESCRIPTION

Figure 1:
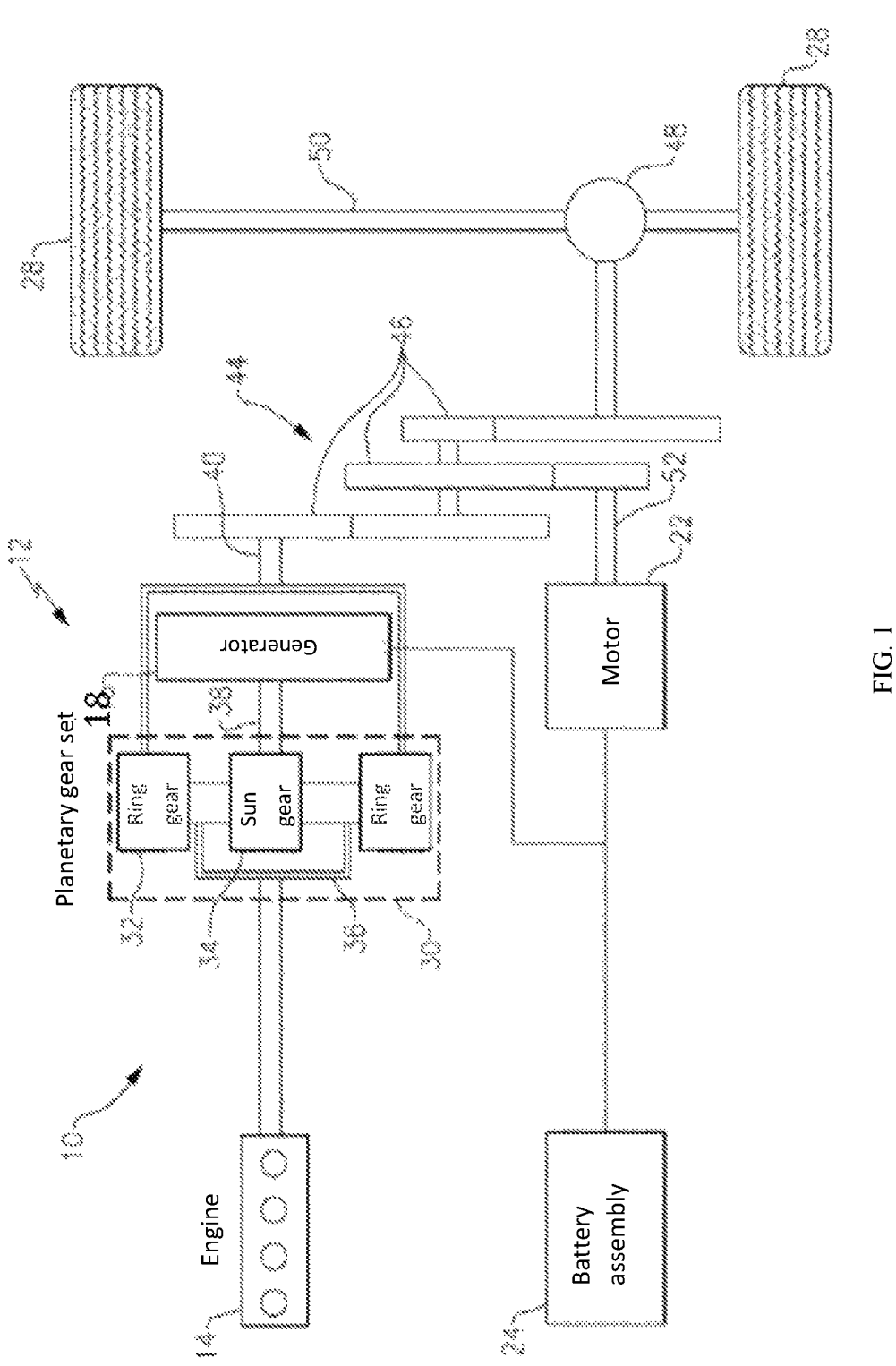
FIG. 1 shows an electrified vehicle to which the battery pack of the present disclosure can be applied.

Embodiments of the present disclosure will now be described in detail with reference to the drawings. For the reference numbers in the drawings, the same or similar reference numbers are used to indicate the same or similar components. In the following description, multiple operating parameters and components are described in multiple embodiments. These specific parameters and components are only included as examples and are not meant to be limiting.

Embodiments of the present disclosure are described below. However, it is to be understood that the disclosed embodiments are merely examples and other embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure. As will be understood by those of ordinary skill in the art, various features shown and described with reference to any one figure may be combined with features shown in one or more other figures to produce embodiments not expressly shown or described. The combinations of features shown herein provide representative embodiments for typical disclosures. However, various combinations and modifications of the features consistent with the teachings of the present disclosure may be desired for certain particular disclosures or implementations.

In this disclosure, relational terms such as first and second, and the like may be used solely to distinguish one entity or action from another entity or action without necessarily requiring or implying any actual such relationship or order between such entities or actions. The terms "comprises", "comprising", "has", "comprising", "includes", "including", "contains", "containing" or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a", "has . . . a", "includes . . . a", "contains . . . a" does not without more constraints preclude the existence of additional identical elements in the process, method, article, or apparatus that comprises the element.

As used herein, the term "and/or" when used to enumerate two or more items means that any one of the listed items can be employed by itself, or any combination of two or more of the listed items can be employed.

One or more embodiments of the present disclosure will be described below with reference to the drawings. The flowchart is used to illustrate an example of the process executed by the system. It should be understood that the execution of the flowchart does not need to be performed in sequence, one or more steps may be omitted, or one or more executed steps may be added, and one or more steps may be performed sequentially or in reverse order. Even in some embodiments one or more steps may be performed simultaneously.

As mentioned in the background, there are various battery pack structures in the prior art. For example, overall strength of the battery pack is enhanced through the design of multiple longitudinal and lateral beams. The structure is relatively complicated and may cause additional weight. The inventor of the present disclosure realizes that the structure and arrangement of the battery pack can be further optimized, so as to solve one or more problems in the prior art, and to provide a reinforced structure for a battery pack that may have one or more advantage of simplified structure, high robustness and good sealing, and a battery pack and a vehicle including the reinforced structure.

Referring to FIG. 1, an example of an electrified vehicle 12 to which the battery pack of the present disclosure can be applied is shown. Although depicted as a hybrid electric vehicle (HEV), it should be understood that the battery pack of this disclosure can be used in other types of electric vehicles, such as deep hybrid plug-in electrified vehicles (PHEV), battery electrified vehicles (BEV), full hybrid electrified vehicles (FHEV), etc.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), a generator 18 and a battery assembly. In this example, the second drive system is considered an electric drive system of the powertrain 10. The first and second drive systems generate torque to drive one or more sets of vehicle drive wheels 28 of the electrified vehicle 12. Although in this illustrative embodiment, a power-split configuration is shown, the disclosure extends to any hybrid electrified vehicle including full hybrids, parallel hybrids, series hybrids, mild hybrids, and micro hybrids. The engine 14 and the generator 18 may be connected through a power transfer unit 30. In addition to planetary gear sets, other types of power transfer units may also be used to connect the engine 14 to the generator 18. In a non-limiting example, the planetary gear set includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Since the generator 18 is operatively connected to the engine 14, the speed of the engine 14 can be controlled by the generator 18.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples. The gears 46 transfer torque from the engine 20 to a differential 48 to ultimately provide traction to the vehicle drive wheels 28. The differential 48 may include a plurality of gears that enable the transfer of torque to the vehicle drive wheels 28. In one example, the second power transfer unit 44 is mechanically coupled to an axle 50 through the differential 48 to distribute torque to the vehicle drive wheels 28.

The battery assembly 24 is an example type of an electrified vehicle battery assembly. The battery assembly 24 can provide power to drive the motor. In regenerative braking, the motor 22 and the generator 18 can output power to the battery assembly 24 for storage. The battery assembly 24 may include a high-voltage battery pack, which may include multiple battery arrays. In the following embodiments, a battery pack that can be incorporated into the above-mentioned example electrified vehicle is provided.

Figure 2:
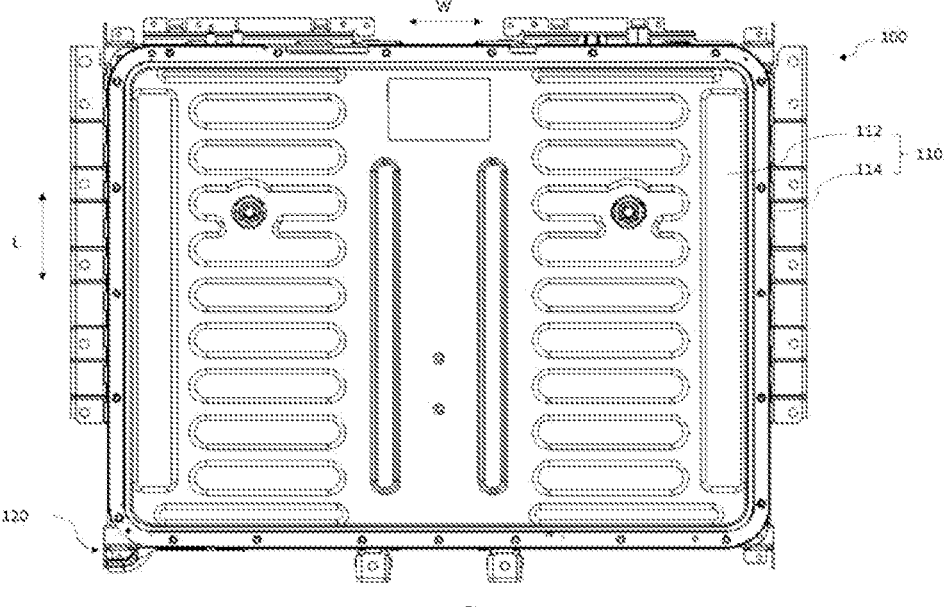
FIG. 2 shows a top view of a battery pack 100 that may be incorporated into an electrified vehicle according to an embodiment of the present disclosure.

FIG. 2 is a top view of a battery pack 100 that may be incorporated into the above-described electrified vehicle. As shown, the battery pack 100 includes a case 110 having a first component 112 and a second component 114 and battery cells located within the case 110. The case of the battery pack 100 is typically grounded to the chassis. Other electrical components in the battery pack 100 can be grounded by being connected to the case of the battery pack 100. For the sake of brevity, the various battery cells and electrical components disposed within the case 110 are omitted here and in the drawings. Those skilled in the art can understand that a predetermined number of battery cells may be arranged in the case 110 in a specific manner according to specific needs. In this embodiment, the first component is an upper cover plate 112, and the second component is a lower tray 114. Those skilled in the art can understand that, in other embodiments, the first component 112 may be a lower tray and the second component 114 may be an upper cover plate. Multiple reinforcement structures and multiple connection locations with the vehicle may be provided around the case 110, which are omitted here for brevity and will not be shown and described. In order to facilitate the description of the following embodiments without limitation, a first direction of the vehicle, such as the width direction of the vehicle, is marked as W, a second direction of the vehicle, such as the longitudinal direction of the vehicle, is marked as L, and the height direction of the battery pack 100 is marked as T.

Figure 3A:
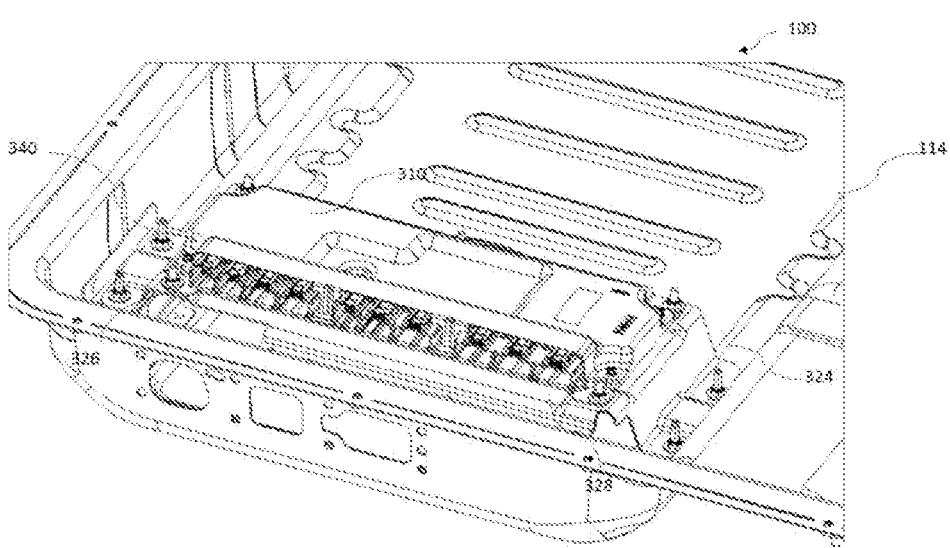
FIG. 3A shows a schematic diagram of an installation position of the battery electric control module bracket according to an embodiment of the present disclosure.
Figure 3B:
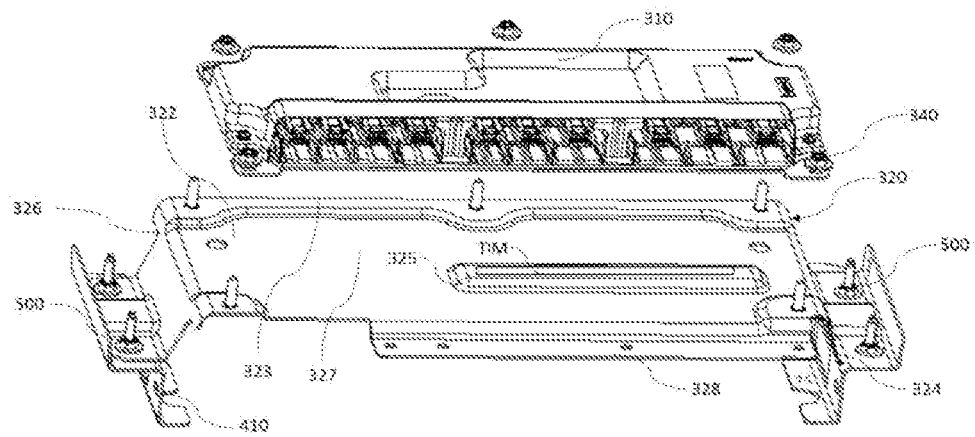
FIG. 3B shows an exploded view of the module bracket and the electronic control module in this embodiment.

FIG. 3A is a schematic diagram showing the installation position of the bracket of a battery electric control module in an embodiment of the present disclosure. FIG. 3B shows an exploded view of the module bracket and the electronic control module in this embodiment. As shown in FIGS. 3A and 3B, an electric control module 310 and a bracket 320 for supporting the electric control module 310 are disposed in the case 110 of the battery pack 100, for example in the lower tray 114, and the electric control module 310 is carried on the bracket 320. Other components and wire harnesses are omitted here for clarity. The bracket 320 includes a bracket body 322 substantially extending in a flat surface, and at least two legs 324 and 326 extending from the bracket body 322. In the described non-limiting embodiment, the bracket body 322 has a rectangular shape. In the described embodiment, the bracket 320 includes a support lug boss 323 located at an edge of the bracket body 322 and a first lug boss 325 spaced from the support lug boss 323.

With further reference to FIG. 3A and FIG. 3B, in one or more embodiments, a component including thermally conductive material such as TIM shown in the figure could be disposed on the first lug boss 325. The thermally conductive material (abbreviated as TIM elsewhere in this disclosure) may include commercially available thermally conductive silicone pads or thermally conductive silicone materials, or other thermally conductive coating materials. A gap of 1.0-2.0 mm can be formed between the first lug boss 325 of the module bracket 320 and the electronic control module 310, which is used for compacting and matching of TIM component, and the number of the TIM component can be two or more. After the TIM component is attached, the TIM component attached to the first lug boss 325 can contact the electronic control module 310. In another embodiment, the entire surface of the module bracket 320 in contact with the electronic control module 310 includes a TIM strip. In one or more embodiments, the lug boss may be formed by stamping. Specifically, in the described embodiment, the first lug boss 325 is a deep-stamping lug boss with a depth of more than 3 mm, which is used to ensure the strength of the lug boss coated with TIM component. The first lug boss 325 has a width of 35 mm to 45 mm, and a length of 140 mm to 220 mm, and the flatness of the stamping boss is less than 0.25 mm. The TIM component can have a length of 150 mm to 200 mm, and a cross-sectional diameter of 3-5 mm. By controlling the size of the TIM component, it can provide better support strength and heat dissipation effect. In one or more embodiments, the thermal conductivity of the TIM component may be greater than 2.0 watts/(meter·kelvin) (W/m K) to provide good thermal conductivity. In addition, the elongation rate of the TIM component can be greater than 60%, and the tensile strength can be greater than 300 kPa, so that the module bracket 310 can provide a good energy and sound absorption effect when the battery pack vibrates. In another embodiment, the TIM component can have good insulation properties. For example, in a specific embodiment, the TIM component can have a resistivity greater than $1.4*10^{13}$ ohm/m, so that it can provide good insulation between the bracket and the electronic control module. In another specific embodiment, the TIM component can provide good water resistance. For example, a material with a water absorption rate of less than 0.1% can be selected.

In the above mentioned embodiment, the thermally conductive material such as TIM component on the support lug boss 323 and the first lug boss 325 can directly contact the electronic control module 310. There is a first gap between non-supporting areas 327, which is the areas other than the support lug boss 323 and the first lug bosses 325, and the electronic control module 310. The first gap may be 2 mm to 8 mm. In another embodiment, the first gap may be 4 mm to 7 mm, so as to reduce or alleviate the vibration between the bracket 320 and the electronic control module 310. In another embodiment, the TIM component can also be omitted, wherein the support lug boss 323 and the first lug boss 325 can directly contact the electronic control module 310. As shown in the figure, at least two legs 324 and 326 are located at the two ends of the bracket body 322. The leg 324 is connected to the tray 114 of the battery pack case 110 through a fastener assembly 500. It can be understood that the legs 324, 326, and 328 of the module bracket 320 may be integrally formed or separately formed. The module bracket 320 may be directly connected to the battery pack case 110 through the fastener assembly 500, or may be connected to the battery pack case via an additional auxiliary bracket (such as the illustrated bracket 410). In addition, for connection stability and protection for high-voltage electrical components under the bracket 320, a third leg 328 between the two ends of the bracket body 322 extending laterally is also provided. The legs 324, 326, 328 are generally sheet-like structures. It is understood that the legs 324, 326, 328 may also have other suitable configurations, such as columnar structures. The fastener assembly 500 includes a fastener and a mating nut. In one or more embodiments, the electronic control module bracket 320 has a thickness of 1 mm to 3 mm. And in another specific embodiment, the thickness of the bracket 320 is 1.2 mm to 2 mm. The size of the connection hole for the fastener to pass through is 9.25 mm-9.35 mm. In one embodiment, the electronic control module bracket 320 is connected to the electronic control module 310 through more than four fasteners, such as the fastener 340 shown in the figure. The structure will be described below in conjunction with further figures.

Figure 4:
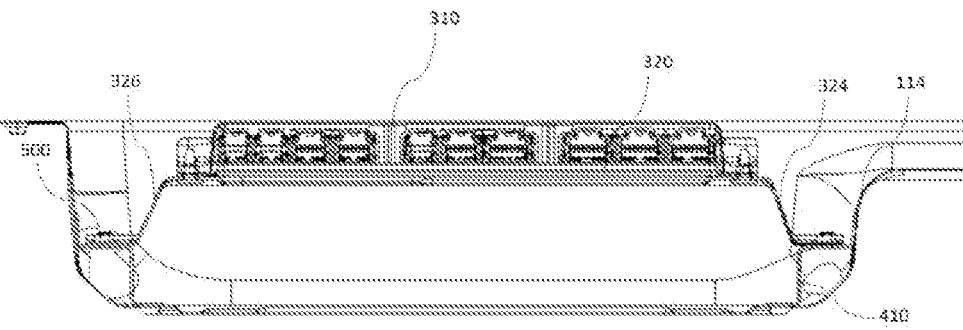
FIG. 4 shows a schematic cross-sectional view of the battery electronic control module bracket.

FIG. 4 shows a schematic cross-sectional view of the battery electronic control module bracket 320, which shows its side configuration more clearly. As shown in the figure, the bracket body 322 of the bracket 320 carries the battery electric control module 310 thereon. The two bracket legs 324 and 326 located at the two ends of the bracket body 322 extend from the bracket body 322 and extend gradually away from each other, so that a substantially trapezoid cross-section is formed in a direction perpendicular to the bracket body 322. The substantially trapezoidal configuration provides space to accommodate high voltage electronic components (such as relays or the like) under it. In a further embodiment, the battery pack case 110 is further provided with a plurality of the above mentioned auxiliary brackets 410 in the case. The plurality of auxiliary brackets 410 are connected with the legs 324 and 326 of the electronic control module 320 brackets through a plurality of fastener assemblies 500. The overall frame structure with a trapezoid upper portion and a rectangular lower portion can provide sufficient strength for support, and can absorb energy when the side is stressed.

Figures 5A, 5B:
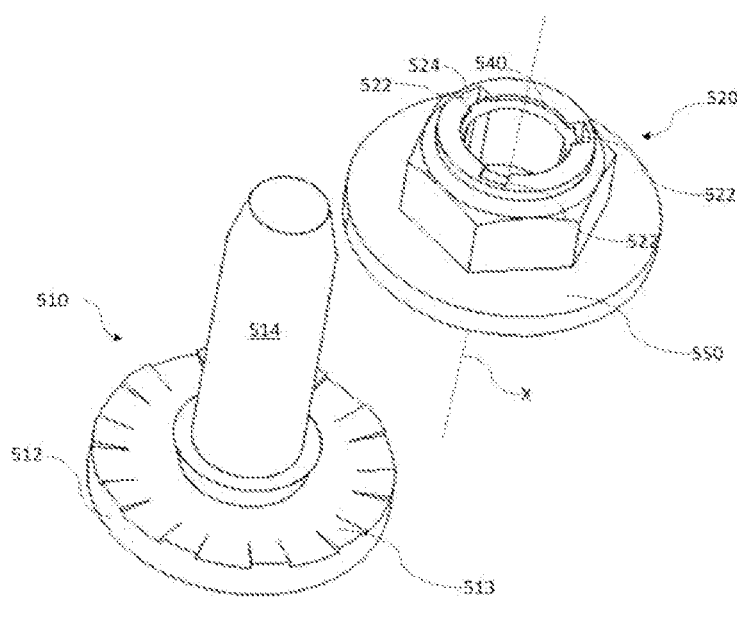
FIG. 5A shows a schematic diagram of a fastener assembly for connecting the battery pack case and the bracket.
FIG. 5B shows a top view of a nut and a fastener in an unassembled state.
Figure 5C:
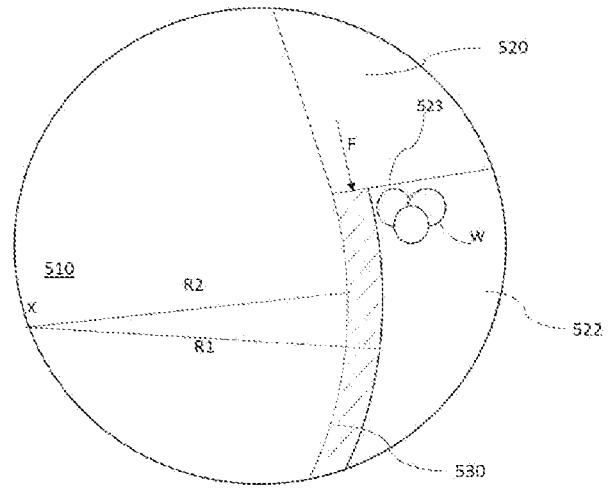
FIG. 5C is an enlarged schematic view of a part of the nut and the fastener covered with a clad layer in an assembled state.

FIG. 5A shows an enlarged schematic view of the fastener assembly 500 for connecting the battery pack case and the bracket. FIG. 5B shows a top view of the nut and fastener in unassembled state. FIG. 5C shows an enlarged schematic view of a part of the nut 520 and the fastener 510 that includes a clad layer in an assembled state. Referring to FIGS. 5A and 5B in conjunction with FIGS. 3A to 4, in one or more embodiments, the electronic control module bracket 320 is connected to the auxiliary bracket 410 through the fastener assembly 500. The fastener assembly 500 includes a fastener 510 and a nut 520 that mates with the fastener 510. The ground wire may lead from the electronic control module 310 through the fastener 340 to the bracket 320, then from the bracket 320 through the fastener assembly 500 to the tray 114 of the battery pack case 110, and finally from the tray 114 to the vehicle chassis. As shown in FIGS. 5A and 5B, the nut 520 includes an axially extending groove 522, which is open toward a central axis X. The open groove 522 has an edge 523. The illustrated embodiment shows three open grooves 522 spaced apart from each other. And it is understood that more or less open grooves 522 can be provided as required. In one or more embodiments, the open groove 522 is a through groove in an axial direction X of the nut. In one or more embodiments, the nut 520 includes at least three or more rectangular grooves 522 extending through the axial direction X, and each rectangular groove 522 has a dimension of approximately (0.5 mm-1.5 mm)* (0.5 mm-1.5 mm).

With continued reference to the figures, in one or more embodiments, the nut 520 is configured to form a tight fit connection with the fastener 510. The nut 520 is configured to form an interference fit with the fastener 510 that includes a clad layer 530. In other words, referring to FIG. 5C, the fastener 510 with the clad layer 530 has an outer diameter R1 greater than an inner diameter R2 of the nut 510 at the edge 523 of the open groove 522. With such an arrangement, when the nut 520 is assembled onto the fastener 510 by a force F as shown in FIG. 5C, it can at least partially form the interference fit with the fastener 510 after scraping the material of the clad layer 530 by the edge 523 during the assembly process. The scraped clad layer material W is shown in the open groove 522, and it can be removed through the open groove 522, or removed in a subsequent step, such as by vacuum suction. In one or more embodiments, the clad layer 530 is formed of an insulating material. The nut 520 and the fastener 510 are formed of a conductive material. When the clad layer 530 is not removed, the nut and fastener may not form a proper electrical connection. In this way, when the clad layer 530 is removed, an electrical connection can be established or formed between the nut 520 and the fastener 510 mating therewith. Thus, the module bracket 320 can be electrically connected to the fastener 510 via the nut 520 and electrically connected to the tray 114 of the battery pack case. It will be appreciated that the open groove 522 may have different shapes as long as it can provide the edge 523 that can remove the clad layer 530 or similar features. In addition, an annular recess is formed in the nut 520. An annular sleeve 540 of a second material is provided in the annular recess. For example, the annular sleeve 540 may be made of nylon material. An annular recess 524 may be formed in the nut 520, and then the annular sleeve 540 of nylon rubber strip is pressed into the annular recess 524. In this way, the torque loss and the loosening possibility of the fasteners 510 can be reduced or alleviated when the battery pack 100 is vibrated with the whole vehicle. In the described embodiment, the dimension of the annular recess 524 in the radial direction is less than that of the open groove 522. The difference D in dimension is shown in FIG. 5B. In this way, the scraped material of the clad layer 530 can be drained through the open groove 522. Alternatively, in another embodiment, the material in the open groove 522 can be removed by a vacuum cleaner or the like.

Figure 6:
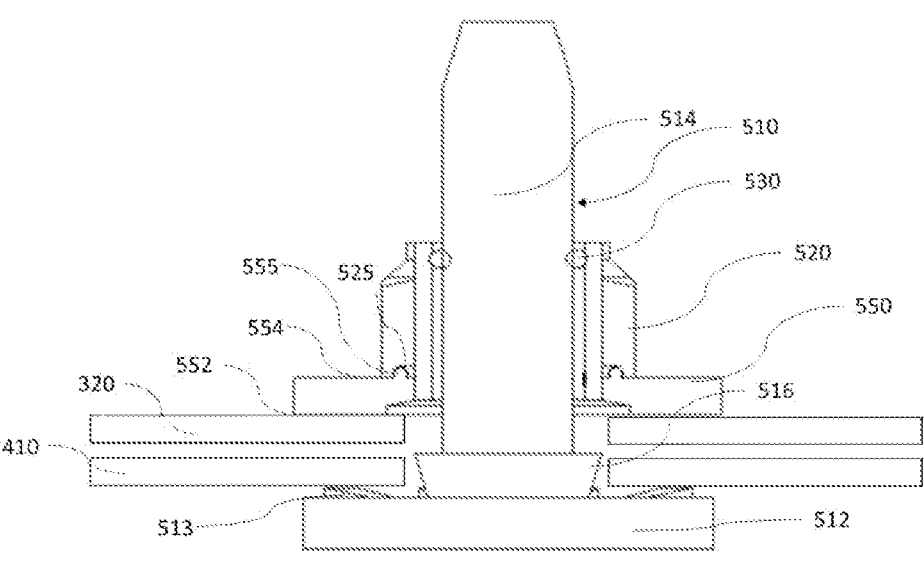
FIG. 6 shows a schematic cross-sectional view of the fastener and the nut in the assembled state according to an embodiment of the present disclosure.

FIG. 6 shows a schematic diagram of the fastener 510 and the nut 520 in the assembled state in one embodiment. In addition, the relative assembly positions of the parts to be connected are schematically shown. The fastener 510 can be connected to the battery pack case 110 or the auxiliary bracket 410 on the battery pack case 110 by welding, riveting or the like in advance. And then the nut 520 can install the electronic control module bracket 320 to the fastener 510. For example, a rivet joint or welded joint can be formed at a serrated lug bosses 513. Alternatively, welding can be applied after riveting to increase the strength. In the illustrated embodiment, the fastener 510 includes a stud 514 and a head 512, and an end of the stud 514 close to the head 512 is provided with a circular step 516 and the circular step 516 has a diameter gradually increasing in a first direction from the head 512 toward the stud 514. In other words, the cross-section of the circular step 516 along its axis is substantially an inverted trapezoid. In some embodiments, the inverted trapezoidal step 516 at the bottom of the stud 514 can be used for riveting the stud 514 on the bracket 320, so as to provide a force against the stud 514 being pushed out. And it can resist a pushing force greater than or equal to 1 KN.

In one or more embodiments, the head 512 of the fastener 510 may include a plurality of serrated bosses. In one embodiment, the side surface of the head 512 of the fastener 510 facing the components to be connected includes no less than six evenly distributed serrated lug bosses 513. In the section along the central axis X shown in FIG. 6, the cross-section of the serrated boss is a triangle. The cross-section of the plurality of serrated lug bosses 513 are not identical, so as to form staggered zigzag bosses. A plurality of serrated bosses may be used for riveting the head 512 of the fastener 510 to the auxiliary bracket 410 to provide resistance to torsional forces. Of course, it can be understood that after the riveting is completed, it can also be reinforced by welding. In one embodiment, it can be configured to resist a torsional torque greater than or equal to 10 N·m.

With continued reference to the figures, in one or more embodiments, the nut 520 may have a washer 550 attached thereto. A first surface 552 of the washer 550 is in contact with the bracket 320, and a second surface 554 of the washer 550 is in contact with the nut 520. The second surface 554 of the washer 550 can have a first arc-shaped feature 555. For example, the feature may be a first arc-shaped protrusion 555. The nut 520 in turn may include a second arc-shaped feature 525. For example, the second arc-shaped feature 525 can be a first arc-shaped notch 525 shown in the figure. And vice versa, for example, the nut 520 may include an arc-shaped or annular protrusion, and the washer 550 may include an arc-shaped or annular notch. The first arc-shaped feature and the second arc-shaped feature cooperate with each other to allow relative rotation between the nut 520 and the washer. By applying torque to the nut 520, the nut 520 can rotate relative to the washer 550, while the washer 550 generally does not rotate. In one or more embodiments, the gap between the notch and the protrusion is 0.1 mm-0.5 mm. The protrusion may be arc-shaped with a circumference of more than 180 degrees, or be a complete ring. And the notch may be correspondingly formed in a ring shape. A protrusion 555 including a circumferential arc length in excess of 180 degrees is schematically shown in FIG. 7. The protrusion 555 and the notch 525 are concentric in the plane in which the washer is located. Referring to FIGS. 8A-8B, in other embodiments, the method includes pre-forming the washer and the nut integrally through a press riveting process. For example, an arc-shaped protrusion 825 can be formed on one of the washer or the nut, and a notch 855 can be formed on the other. By pressing riveting, the arc-shaped protrusion 825 can form a protrusion 825' with a mushroom head section. Correspondingly, a notch 855 that is matched with the protrusion is formed on the mating part. In the described embodiment, the washer 550 can be rotated without releasing from the nut 520 during use and transport. In one or more embodiments, by installing a rotatable washer 550 on the bottom of the nut 520, metal debris can be alleviated during the installation process of the nut 520. When it is applied torque, the nut 520 rotates and the washer 550 does not rotate, which can alleviate the friction between the nut 520 and the bracket 320 (which can be made of aluminum, for example) and reduce metal debris (such as aluminum debris).

Referring to FIG. 9, securing means (such as a clip 920 and a wire harness retainer 930) for a wire harness 910 are illustrated in this figure. A through hole may be formed on the bracket 320 for providing a clip point for the wire harness clip 920. In addition, as shown, the wire harness retainer 930 has another configuration. It utilizes the fastener assembly 500, such as a stud in particular, to provide a wire harness clip point. The wire harness retainer 930 can be formed by setting the illustrated sleeve locking portion 560 on the stud and providing a wire harness clip 562 on the sleeve locking portion 560. It can be understood that the wire harness retainer 930 may be an integral structure, that is, the sleeve locking portion 560 and the wire harness clip 562 may be integrally formed. Alternatively, in other examples, the sleeve locking portion 560 and the wire harness clip 562 may be separately formed and connected together by means of snapping, bonding, etc. so as to form the wire harness retainer 930. One or more wire harness retainers 930 can be used to fix multiple wire harnesses and alleviate friction between the wire harness 910 and the bracket 320 during the vibration of the pack, without damaging the wire harness 310.

FIG. 10 provides a method for grounding the battery pack. The method starts at block 1010. At block 1020, fasteners and battery pack case are provided. It can be understood that the fasteners (e.g. 510) can be welded directly to the battery pack case (e.g. 114) as described in the above embodiments. The fasteners (e.g. 510) can also be welded to auxiliary brackets (e.g. 410) located within the battery pack case. It will be appreciated that the fasteners may also be attached to the battery pack case by other means. Next, at block 1030, the battery pack case and fasteners are dipped into electrophoretic coating; and the electrophoresis coating is dried at block 1040 to form a clad layer covering the battery pack case and the fasteners (e.g. 530 in the above example). The clad layer can facilitate the insulation performance and corrosion resistance of the battery pack case. However, the presence of the clad layer hinders the grounding of the module bracket when subsequently connecting the module bracket to the battery pack case. It may be necessary to manually remove some area of the coating, or to add electrical connection through additional connection parts to ground. According to the method of the present disclosure, at block 1050, a nut (e.g. the nut 520 with the open groove 522 described above) is installed to the fastener (e.g. 510) to attach the module bracket (e.g. 320) to the battery pack case (e.g. 114) and allow the nut to scrape off the clad layer material when installed, so as to form the electrical connection. As mentioned above, the nut includes an open groove open toward the axis. The method then ends at block 1060.

Although not detailed in the above exemplary method, it will be appreciated that the nut provided therein may be configured to form a tight fit connection with the fastener. And the nut may be configured to form an interference fit with the fastener that includes the clad layer, wherein the nut and the fastener at least partially form the tight fit connection after the edge of the nut scraps off some clad layer material. In other words, it can be configured that the outer diameter of the fastener having the clad layer is larger than the inner diameter of the nut at the edge.

In some other embodiments, the open groove is a through groove in the axial direction of the nut so as to at least partially allow the scraped clad layer material to drain through the through groove. The method also includes removing residual clad layer material within the through groove by vacuum suction.

In yet other embodiments, the fastener may also be held in place by forming an annular recess in the nut and providing an annular sleeve of a second material in the annular recess.

In yet other embodiments, a washer may be provided in connection with the nut, wherein the nut and the washer each include one of a protrusion or a notch. The protrusion and notch may be formed in an annular shape, allowing the connection and relative rotation between the nut and the washer. Thus, when torque is applied to the nut, the washer is kept from rotating. Thereby, metal debris can be alleviated from the relative friction between the washer and the bracket. Of course, in other embodiments, adhesive may also be provided on a bottom surface of the washer in contact with the bracket, so that when torque is applied to the nut, it can be ensured that there is no friction between the washer and the bracket.

One or more of the above-described embodiments provide a bracket for an electrical control module and a method for forming a ground connection. According to another aspect of the present disclosure, there is also provided a vehicle including a battery pack having the module bracket as described in the above embodiments, and a battery pack grounded by the above method. With the optimized structure design, the operation can be simplified by removing the clad layer and making a ground connection during the installation. The optimized bracket design can provide better heat dissipation, fixing, buffering functions, and can also use fasteners to complete wire harness fixing, etc. Those skilled in the art can make various changes, modifications and variations to these specific embodiments without departing from the spirit and scope defined by the claims of the present disclosure.

Certain combinations and subcombinations regarded as novel and non-obvious are particularly pointed out in this disclosure. Particular embodiments may refer to "an" element or a "first" element or similar features. Such descriptions should be understood to include one or more such elements, neither requiring nor excluding two or more such elements. Other combinations and subcombinations of the described features, functions, elements, and/or properties may be claimed through amendment of the current disclosure or through presentation in this or a related disclosure. Such claims, whether broader, narrower, equivalent, or different to the original claims, also should be regarded as included within the subject matter of this disclosure. The above descriptions are only preferred embodiments of the present disclosure, and are not intended to limit the present disclosure. For those skilled in the art, the present disclosure may have various modifications and changes. Any modification, equivalent replacement, improvement, etc. made within the spirit and principle of this disclosure shall be included within the protection scope of this disclosure.

The invention claimed is:

1. An electronic control module bracket assembly for a battery pack, comprising:

a battery pack case;

a fastener assembly;

a module bracket connected to the battery pack case through the fastener assembly, wherein the fastener assembly includes a nut and a fastener having a clad layer, the nut including an open groove extending axially and opening toward its central axis, wherein at least a portion of the open groove at an edge has a first inner diameter, the fastener with the clad layer has a first outer diameter, and the first inner diameter is smaller than the first outer diameter, and wherein the edge of the open groove of the nut is configured to scrape a material of the clad layer while the nut is being installed to the fastener, thereby electrically connecting the module bracket to the fastener.

2. The electronic control module bracket assembly as recited in claim 1, wherein the nut is configured to form an interference fit with the fastener that includes the clad layer, and the nut at least partially forms the interference fit after scraping the clad layer with the edge of the nut.

3. The electronic control module bracket assembly as recited in claim 1, wherein the nut further includes an annular sleeve disposed in an annular recess at an inner peripheral wall of the nut, and the annular recess has a dimension in a radial direction smaller than that of the open groove.

4. The electronic control module bracket assembly as recited in claim 1, further comprising an electronic control module carried on the module bracket, wherein a support lug boss of the module bracket directly contacts the electronic control module, and a first gap is formed between the electronic control module and a non-supporting area outside the support lug boss.

5. The electronic control module bracket assembly as recited in claim 1, wherein the module bracket includes a bracket body and at least two bracket legs extending from the bracket body, each bracket leg is electrically connected to the battery pack case through the fastener assembly, and the module bracket is configured to carry an electronic control module thereon and accommodate a high-voltage electronic component under the module bracket.

6. The electronic control module bracket assembly of claim 1, wherein the fastener assembly further comprises a washer, a first surface of the washer is configured to contact the module bracket, a second surface of the washer is configured to contact the nut, the second surface of the washer comprises a first arc-shaped feature, the nut comprises a second corresponding arc-shaped feature, the first arc-shaped feature and the second arc-shaped feature cooperate with each other to establish a connection and allow relative rotation between the nut and the washer, wherein the first arc-shaped feature is one of a protrusion and a notch, and the second arc-shaped feature is the other.

7. The electronic control module bracket assembly as recited in claim 6, wherein the second surface of the washer comprises a protrusion with a mushroom head cross-section, and the nut comprises a notch matched with the protrusion, and wherein in the plane where the washer is located, the protrusion and the notch are of concentric configuration.

8. The electronic control module bracket assembly as recited in claim 1, wherein the fastener includes a stud and a head, a circular step is disposed at an end of the stud close to the head, the circular step has a gradually increasing diameter in a first direction from the head to the stud, and a plurality of serrated lug bosses are formed on the surface of the head facing the stud.

9. The electronic control module bracket assembly as recited in claim 1, further comprising a wire harness retainer disposed on the fastener assembly, wherein the wire harness retainer includes a sleeve-shaped locking portion mounted on the fastener assembly and a wire harness clip extending from the sleeve-shaped locking portion.

10. The electric control module bracket assembly as recited in claim 1, wherein the module bracket includes a support lug boss located at an edge of the module bracket, a first lug boss spaced from the support lug boss, and a thermally conductive material attached to the first lug boss.

* * * * *